(No Model.)
W. S. McMILLAN.
TOASTER.
No. 456,275. Patented July 21, 1891.
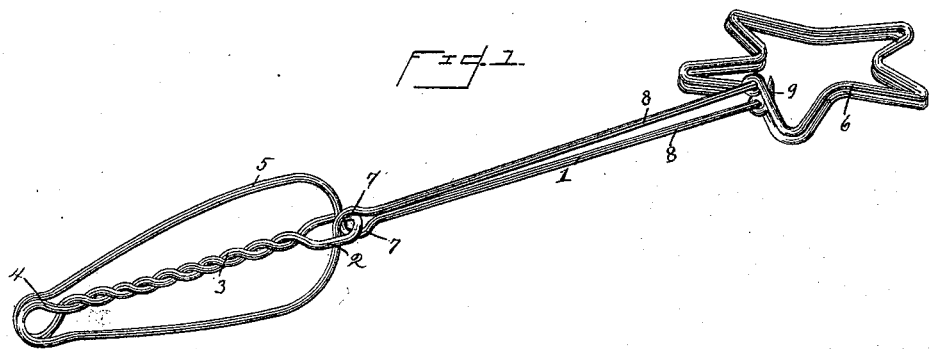
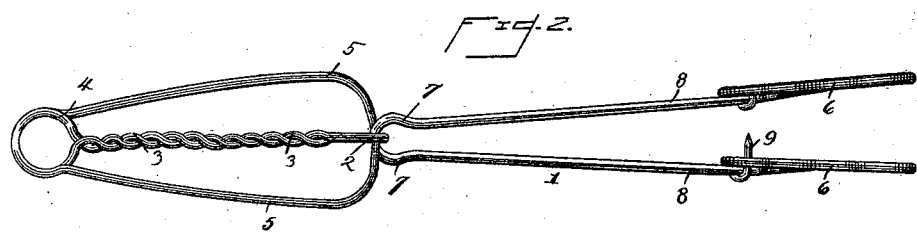
Witnesses
Chas. A. Ford.
H. J. Riley
Inventor
W. S. McMillan
By his Attorneys,
C. A. Snow & Co.

UNITED STATES PATENT OFFICE.

WILLIAM STEUART McMILLAN, OF AVOCA, PENNSYLVANIA.

TOASTER.

SPECIFICATION forming part of Letters Patent No. 456,275, dated July 21, 1891.

Application filed January 24, 1891. Serial No. 378,935. (No model.)

*To all whom it may concern:*

Be it known that I, WILLIAM STEUART MCMILLAN, a citizen of the United States, residing at Avoca, in the county of Luzerne and State of Pennsylvania, have invented a new and useful Toaster, of which the following is a specification.

This invention relates to improvements in toasters.

The object of the present invention is to provide a simple and inexpensive toaster adapted to securely hold the bread or other articles to be toasted and capable of having its jaws readily separated to release the bread after toasting.

The invention consists in the construction and novel combination and arrangement of parts hereinafter fully described, illustrated in the accompanying drawings, and pointed out in the claims hereto appended.

In the drawings, Figure 1 is a perspective view of a toaster constructed in accordance with this invention. Fig. 2 is a side view of the same, the jaws being slightly separated.

Referring to the accompanying drawings, 1 designates a toaster constructed of a single piece of wire which is doubled on itself to form a loop 2, and is twisted into a stem 3, and is reversely coiled to form a spring 4, and is extended on opposite sides of the stem 3 to form curved handles 5, which are normally held separated by the spring 4 to close the jaws 6, and are adapted to be compressed by the hand to open the jaws 6 to receive or release the bread or other article to be toasted. The wire, after forming the curved compressible handles 5, is passed through the loop from opposite sides, and is bent at 7 around the loop to bring straight arm portions or rods 8, which connect the jaws and the handle, close together. After forming the straight arms 8 the wire is bent to form similar jaws 6, which are preferably in the form of a star, and the ends of the wire are bent around the ends of the arms to preserve the shape of the jaws, and one end is extended inward to form a point 9, adapted to engage the bread or other article and secure it between the jaws and prevent slipping.

The curved compressible handles and the stem 3 form the handle proper of the toaster, which is designed to be held in one hand, and the curved compressible portions 5 are adapted to readily be operated to open and close the jaw 6.

It will be seen that the toaster is simple and inexpensive in construction and adapted to be readily operated, and is capable of securely holding bread or other articles and preventing the same slipping from between the jaws.

Having thus described my invention, what I claim is—

1. A toaster constructed of a single piece of wire and comprising the stem 3, provided at one end with a loop 2 and at the other end with a spring 4, the compressible handles 5, passing through the loop 2, the jaws, and the straight portions 8, connecting the jaws and the handles 5, substantially as described.

2. A toaster constructed of a single piece of wire and provided with jaws, one end of the wire being bent inward from the jaws to provide a point 9, substantially as described.

3. A toaster constructed of a single piece of wire comprising the twisted stem 3, provided at its inner end with a loop 2 and at its outer end with the coiled spring 4, the handle portions 5, extending from the spring and arranged on opposite sides of the stem and adapted to be compressed and passing through the loop 2 from opposite sides of the same, the jaws, and the straight portion 8, connecting the jaws with the handle portions 5, substantially as described.

In testimony that I claim the foregoing as my own I have hereto affixed my signature in presence of two witnesses.

WILLIAM STEUART McMILLAN.

Witnesses:
A. A. LAW,
JOHN McCRINDLE.